Aug. 5, 1930.  F. E. SMITH  1,772,162
CAR
Filed Aug. 28, 1929  3 Sheets-Sheet 1
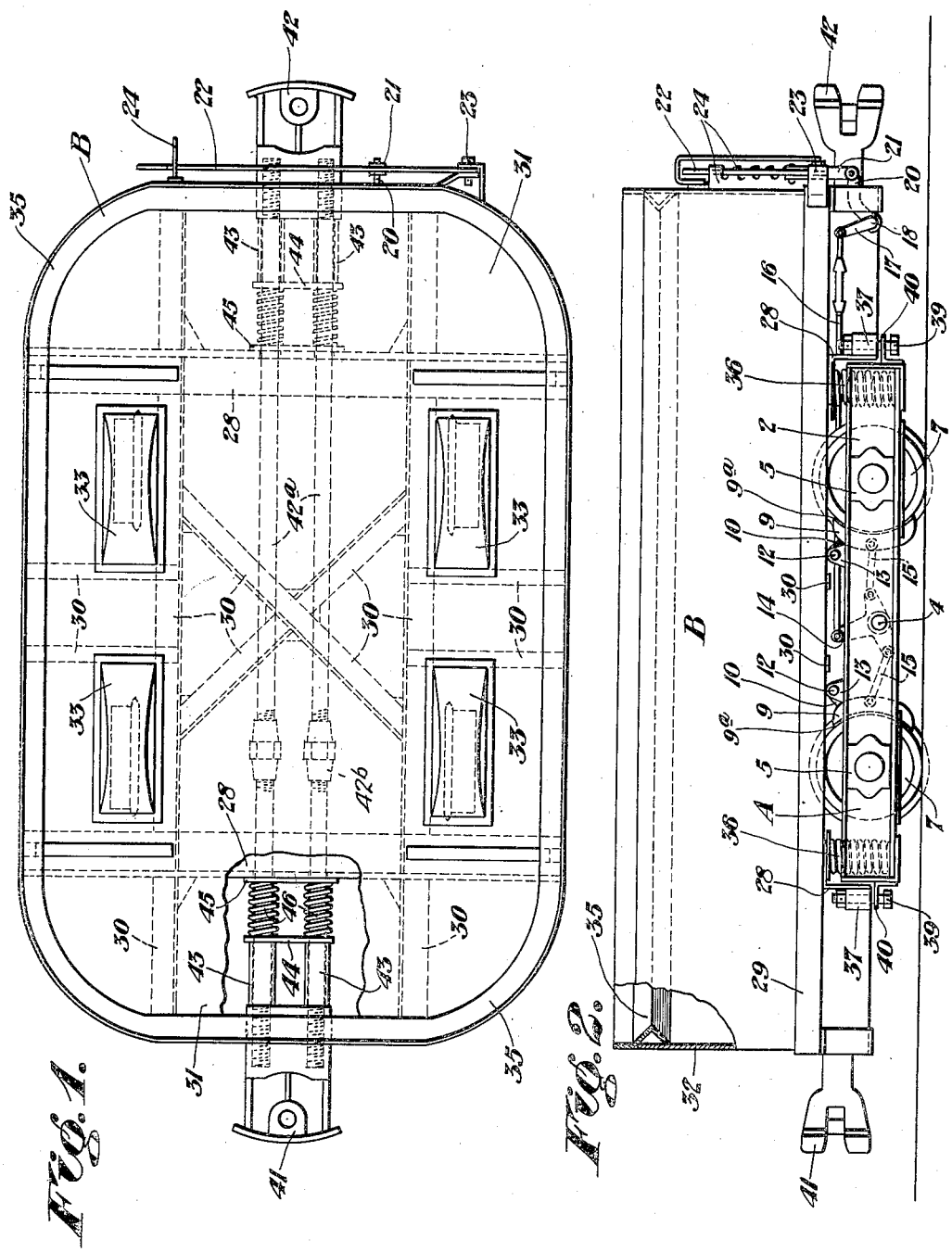
Inventor:
FRANK E. SMITH,
by: Usina & Rauber
his Attorneys.

Aug. 5, 1930.    F. E. SMITH    1,772,162
CAR
Filed Aug. 28, 1929    3 Sheets-Sheet 2
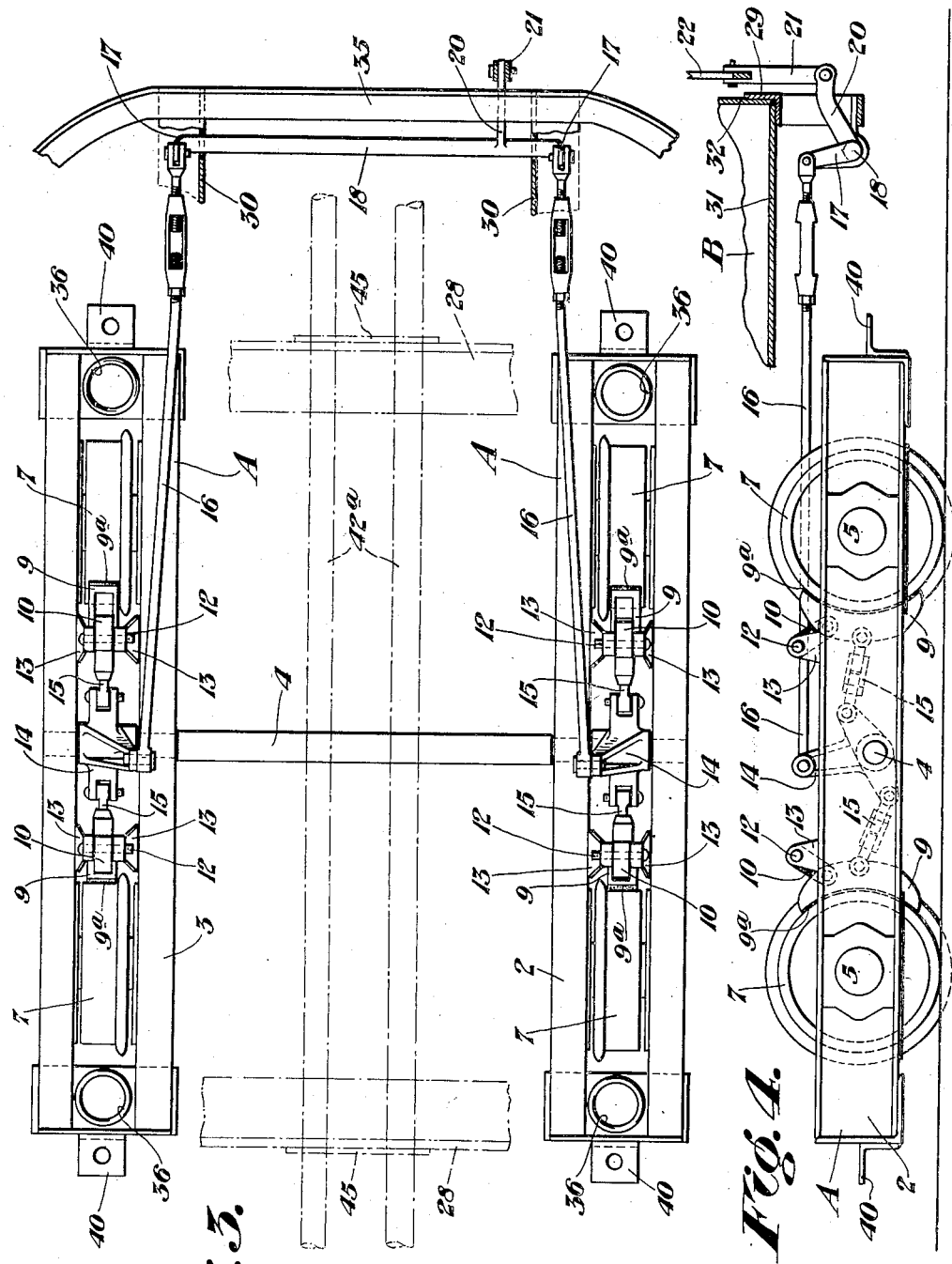
Inventor:
FRANK E. SMITH,
by: Usina & Rauber
his Attorneys.

Aug. 5, 1930.    F. E. SMITH    1,772,162
CAR
Filed Aug. 28, 1929    3 Sheets-Sheet 3

Inventor:
FRANK E. SMITH,
by: Usina & Rauber
his Attorneys

Patented Aug. 5, 1930

1,772,162

UNITED STATES PATENT OFFICE

FRANK E. SMITH, OF SCOTTDALE, PENNSYLVANIA

CAR

Application filed August 23, 1929. Serial No. 388,943.

This invention relates to mine cars and has for one of its objects the provision of a car of the class described having novel means for connecting the coupling members and car body.

A further object is to provide an improved form of truck construction.

A still further object is to provide a novel body construction and novel spring mounting for the body on the truck.

In the drawings—

Figure 1 is a plan of a car made in accordance with my invention.

Figure 2 is a side elevation, partly in section.

Figure 3 is a sectional plan showing details of the trucks and brake mechanism of the car.

Figure 4 is a sectional side elevation showing the trucks of Figure 3.

Figure 5:
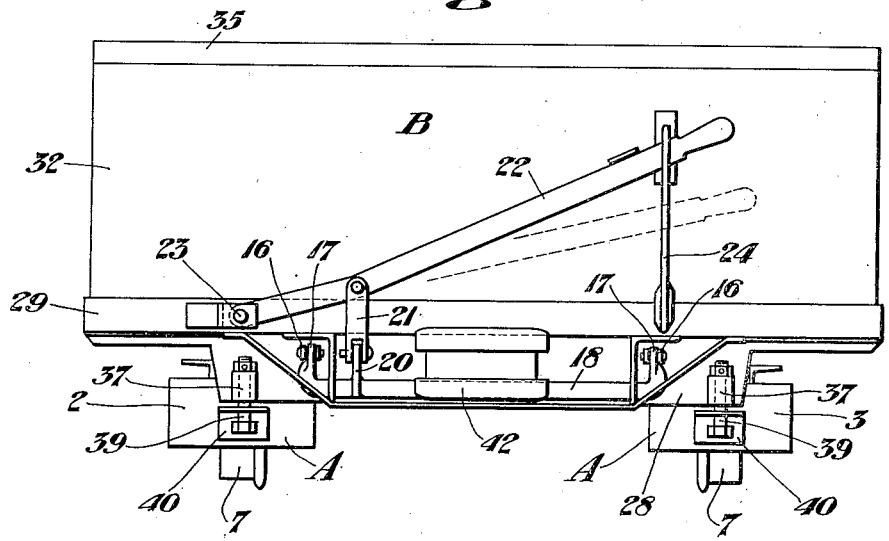
Figure 5 is an end elevation of the car.
Figure 6:
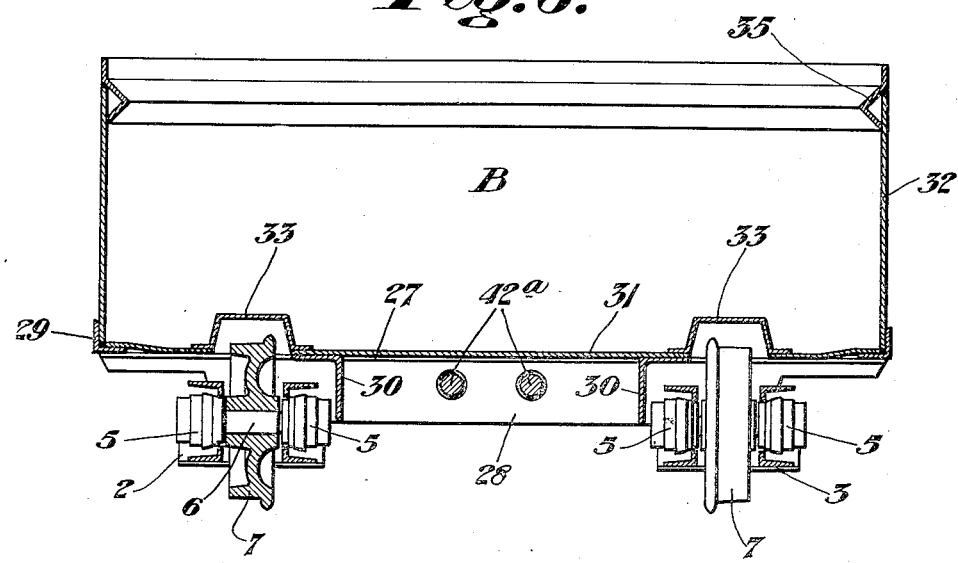
Figure 6 is a transverse section of the car.

Referring more particularly to the drawings, the letter A designates the car truck as a whole and the letter B designates the body of the car as a whole.

The truck A is composed of a pair of side units 2 and 3 which are connected by a transverse shaft member 4 intermediate their ends. Each of the side units comprises an elongated, substantially rectangular frame portion composed of rolled shapes and self-aligning anti-friction bearings 5 are mounted in pairs adjacent each end thereof to receive stub axles 6 which are journaled therein.

While I have shown the bearings 5 as roller bearings of a standard make it will be understood that I do not wish to be limited thereto since any standard or even special anti-friction bearing may be used.

Wheels 7 are keyed or otherwise secured on the axles 6 and are movable longitudinally of said axles so as to permit said wheels to automatically adjust themselves to irregularities in the track gage.

A brake shoe 9 is provided for each of the wheels 7 and said shoes are suspended on links 10 pivotally carried by pivot pins 12 mounted in brackets 13 within the side frame units. The shoes 9 are composed of a relatively light cast body and have their braking faces lined with brake lining $9^a$ similar to that commonly used on automobile brakes and other vehicles.

Brake operating toggle levers 14 are pivotally mounted adjacent the end of the shaft 4 within each of the side frames 2 and 3, and have their toggle arms connected by adjustable toggle links 15 with the brake shoes 9 within the respective frames.

The operating arms of the toggle levers are pivotally connected to brake rods 16 which extend forwardly to adjacent the end of the car and are pivotally connected to crank-arms 17 of a crank shaft 18 which is journaled transversely of the car body B and has an operating arm 20 thereof which is connected by a link 21 with an operating lever 22. The lever 22 is pivotally mounted at one end, as at 23, on the car body B and the link 21 is pivotally connected to the lever 22 intermediate its ends, so that depressing the lever 22 will cause the arm 20 to move downwardly through pressure of the link 21, thus rocking the shaft 18 clockwise so as to pull the rods 16 and thereby rock the toggle levers 14 so as to force the brake shoes against the wheels. A suitable brake ratchet 24 is mounted on the end of the car body B and the lever 22 is adapted to be engaged with said ratchet to hold the brake shoes in engagement with the wheels.

The car body B is composed of an underframe 27 made up of angles and plates and is entirely separate from the truck. The underframe consists essentially of two main end sill members 28 and a continuous outer rim portion 29 which are connected by suitable supporting braces and truss members 30.

A bottom plate 31 is mounted over the entire frame to form the bottom of the car body and suitable upstanding side plates 32 are mounted around the rim 29 to form sides and ends of the car body.

Throughout the truck A and body B all permanent joints and connections are welded wherever possible. Therefore, the plates 31 and 32 are welded to each other and to the frame 27 so as to form a unitary structure.

The bottom plate 31 is cut away over the wheels of the truck to provide clearance and a separate housing 33 is positioned over each of the cut-away portions and welded in position.

The sides and ends of the body are stiffened and reenforced at their upper edge by a rolled angle rim 35. The angle rim 35 is formed from a shape having one leg longer than the other and the long leg is bent at an angle at a point from the apex substantially equal to the length of the short leg from the apex so that the bent portion will extend parallel with the side and end walls of the body. The angle rim 35 is welded to the side and end plates or walls of the body, as shown, and serves to stiffen and reenforce them and to prevent them spreading under load.

Coiled springs 36 are mounted within the truck side frames 2 and 3 and extend above said units a substantial distance to receive the car body B and form a spring mounting therefor.

Apertured lugs 37 are provided at the opposite ends of each of the body frame end sills 28 and king bolts 39 are mounted in said lugs and extend through other apertured lugs 40 on the ends of the side frames 2 and 3 of the truck. The bolts 39 are free to move in the apertured lugs and serve to prevent displacement of the car body but do not prevent the movement of said body on the springs 36.

The coupling mechanism or bumpers of the car are carried in the car body frame and comprise coupling heads 41 and 42 which are connected by rods 42$^a$ extending throughout the length of the car body and passing freely through apertures in the end sills 28 of the body frame.

The rods 42$^a$ have threaded ends which are screwed into internally threaded holes in the coupling heads 41—42, a left-hand thread being provided on one end of one section of the rods 42$^a$ to engage with the sleeve nut 42$^b$ forming part of the rods 42$^a$.

Sleeves 43 are mounted on the rods 42$^a$ at each end and tie plates 44 are mounted on the rods and bear against the sleeves. Other tie plates 45 are mounted on the rods and bear against the end sills 28 of the body frame and coiled springs 46 are mounted on the rods between the plates 44 and 45 and serve to cushion the load of the car as it is taken by the couplings when operating the car. By this novel coupling or bumper construction the springs need only be of sufficient strength to haul one car instead of the usual construction wherein they must carry the strain of the whole train, and further, the entire load strain is carried by the coupling mechanism and body frame and no pulling or propelling strains are delivered through the body proper.

Many advantages result from the novel car construction of this application; the body and truck are separate units, permitting replacement of either unit; the truck construction permits individual wheel movement without the wheels running free on the axles; the spring suspension of the body allows the wheels to operate over uneven track without throwing twists into the body; the brake mechanism is rigidly supported and independently adjustable for each wheel, and other detail advantages which will be apparent to those skilled in the art.

While I have shown and described one specific embodiment of my invention it will be understood that I do not wish to be limited thereto since various modifications may be made without departing from the scope of my invention, as defined in the appended claims.

I claim—

1. A mine car comprising a truck member composed of a pair of individual side units joined intermediate their ends by a single shaft, a pair of axles journaled in bearings in each of said units, wheels on said axles, a body member composed of a frame having bottom, side and end plates secured thereto, coiled springs mounted between said body and said truck adjacent each corner thereof, said springs being secured to said body and said truck, and forming a connection between said body and said truck.

2. A mine car comprising a truck member composed of a pair of individual side units joined intermediate their ends by a single shaft, a pair of axles journaled in bearings in each of said units, wheels on said axles, a body member composed of a frame having bottom, side and end plates secured thereto, coiled springs mounted between said body and said truck adjacent each corner thereof, said springs being secured to said body and said truck and forming a connection between said body and said truck, a coupling unit comprising a head member at each end of the car, said head members being connected by rigid members having a free sliding connection with the body frame, and springs secured to said members and engaging said body so as to receive and deliver the strain loads between said body and coupling unit.

3. In a mine car a truck member comprising a pair of individual side units joined intermediate their ends by a single shaft, a pair of axles journaled in anti-friction bearings in each of said units, wheels on said axles, brake shoes suspended from each of said truck side units adjacent each of said wheels, toggle mechanisms mounted on said shaft in each of said truck side units and connected to the brake shoes of their respective units, and means for operating said toggle mechanisms to apply and release the brake shoes.

4. In a mine car construction a truck comprising a pair of side units, a single tie shaft member connecting said units intermediate their ends, each of said units comprising a substantially elongated rectangular continuous frame member, a stub axle journaled in anti-friction bearings adjacent each end of said frame member, a wheel on each of said axles, a brake shoe pivotally suspended adjacent each of said wheels, a toggle lever pivoted on said tie shaft, adjustable toggle links connecting said toggle lever and said brake shoes, and means for simultaneously operating the toggle levers of both of said side units to simultaneously operate all of said brake shoes.

5. In a mine car construction a truck comprising a pair of side units, a single tie shaft member connecting said units intermediate their ends, each of said units comprising a substantially elongated rectangular continuous frame member, a stub axle journaled in self-alining anti-friction bearings adjacent each end of said frame member, a wheel mounted on and rotatable with each of said axles, said wheels being slidable on said axles to permit automatic adjustment for slight irregularities in track gage, a brake shoe pivotally suspended adjacent each of said wheels, a toggle lever pivoted on said tie shaft, adjustable toggle links connecting said toggle lever and said brake shoes, and means for simultaneously operating the toggle levers of both of said side units to simultaneously operate all of said brake shoes.

In testimony whereof, I have hereunto set my hand.

FRANK E. SMITH.